United States Patent [19]  
Barringer

[11] 4,057,734  
[45] Nov. 8, 1977

[54] SPECTROSCOPIC APPARATUS WITH BALANCED DUAL DETECTORS

[75] Inventor: Anthony Rene Barringer, Willowdale, Canada

[73] Assignee: Barringer Research Limited, Rexdale, Canada

[21] Appl. No.: 606,131

[22] Filed: Aug. 28, 1975

[51] Int. Cl.² ............................................. G01N 21/26
[52] U.S. Cl. .................................... 250/575; 250/345
[58] Field of Search ............... 250/573, 575, 233, 576, 250/577, 340, 341, 342, 343, 345, 346, 373; 356/95.96 R

[56] References Cited  
U.S. PATENT DOCUMENTS

| 3,504,978 | 4/1970 | Shibata et al. | 250/575 |
| 3,680,957 | 8/1972 | Fukuda | 250/576 |
| 3,895,233 | 7/1975 | Boll et al. | 250/373 |
| 3,973,849 | 8/1976 | Jackson | 356/95 |

Primary Examiner—Alfred E. Smith  
Assistant Examiner—David K. Moore  
Attorney, Agent, or Firm—Rogers, Bereskin & Parr

[57] ABSTRACT

A spectrometer having two photoelectric channels the outputs of which are compared in order to measure gas or liquid concentrations, and means for automatically balancing the photoelectric channels immediately prior to each successive measurement, said means including a reference source of radiation which is utilized for balancing both photoelectric channels, so that when a measurement of the gas or liquid is being made, both photoelectric channels as nearly as possible are effectively balanced.

15 Claims, 5 Drawing Figures

FIG.1

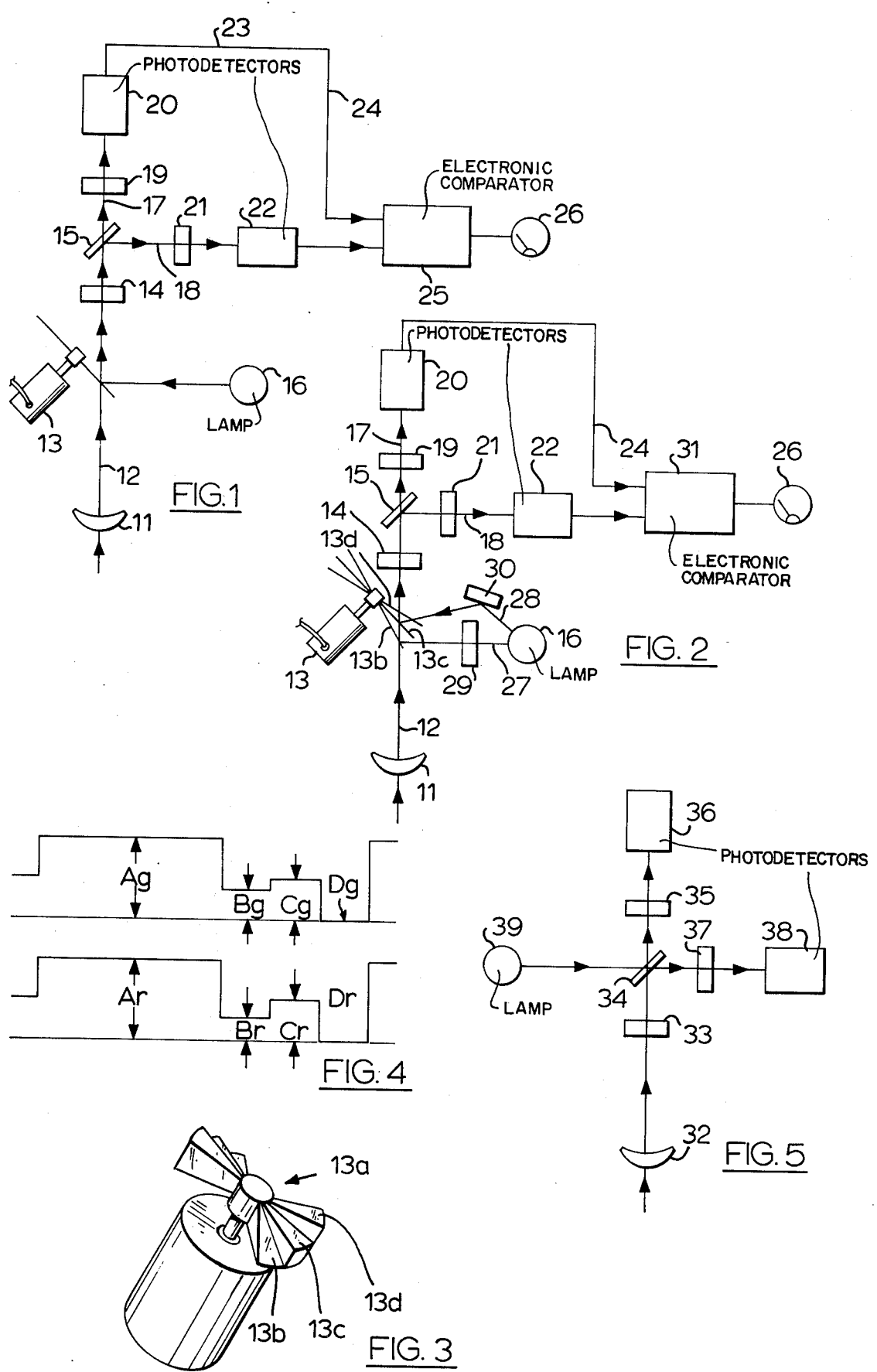

SPECTROSCOPIC APPARATUS WITH BALANCED DUAL DETECTORS

This invention relates to spectroscopic apparatus for measuring the intensity of predetermined spectra, for example, for measuring the concentration of a gas or liquid.

Numerous spectroscopic devices have been employed in the past for measuring gas or liquid concentrations with high sensitivity. Many of such devices employ a single photodetector which is operated in a "chopped" mode wherein the photodetector alternately is exposed to radiation which contains the spectra to be measured (measuring beam) and radiation which has been filtered to remove said spectra (reference beam). The differential intensity of the measuring and reference beams is a measure of the concentration of the gas or liquid. Other conventional spectrometers employ two photodetectors, one photodetector being exposed to the measuring beam and the other photodetector being exposed to the reference beam. The difference in the outputs of the photodetectors is a measure of the gas or liquid concentration.

A problem with conventional spectrometers of the chopped single photodetector type is that they are unable to perform satisfactorily when the intensity of the incoming radiation rapidly fluctuates, as for example when the spectrometer is mounted in an aircraft in a downward looking mode so that it receives radiation reflected or emitted from the surface of the earth. This is due to the fact that when the incoming radiation is subject to random fluctuations it tends to contain frequency components which match those of the chopping frequency which results in a noise signal that tends to limit the sensitivity of the spectrometer. Although spectrometers of the two photodetector type do not have this particular problem, they are subject to undesirable differential drifts in the outputs of the two photodetectors due for example to thermal variations. The problem of thermal drift also affects conventional spectrometers of the single photodetector type due to thermal changes in the optics of the measuring beam relative to thermal changes in the optics of the reference beam. These differential thermal changes may be particularly severe in the case of spectrometers operating in the thermal infra-red region at wavelengths greater than four micrometers.

These problems have largely been overcome in the present invention, in which two photodetectors and a reference source of radiation are employed in a novel configuration. According to the invention, radiation from an external source being measured and radiation from a reference source alternately shine on two photodetectors. One photodetector is exposed to the measuring beam, and the other photodetector is exposed to the reference beam. Both photodetectors are simultaneously exposed to radiation containing the spectra being measured, and then, in a cyclical manner, both photodetectors are simultaneously exposed to radiation from the reference source. During intervals when both photodetectors are exposed to radiation from the reference source, the optical and electrical response of each of the two photodetectors and their respective associated optical and electronic channels is measured, and any unbalance which may exist between said channels automatically is compensated when the two photodetectors next are exposed to radiation from the external source so that when a measurement is being made of the radiation from the external source, the two optical and electronic channels effectively are balanced. The outputs of the two photodetectors are analyzed in accordance with conventional practice, for example by obtaining the ratio of the outputs, in order to ascertain the concentration of the gas or liquid being measured. A spectrometer constructed in accordance with the present invention is relatively insensitive to fluctuations in the intensity of the light incident upon the spectrometer which ordinarily is a serious problem in conventional spectrometers. In addition, differential thermal changes in the two channels, which can be very serious in the thermal infra-red range, are compensated by the present invention. The invention is applicable to the measurement of the concentration of gases or liquids with either emissive or absorptive sources and is applicable to the entire optical spectrum from the short ultraviolet to the far infra-red.

In the accompanying drawings,

FIG. 1 is a simplified diagramatic view of a preferred embodiment of the invention shown in simplified form to more clearly illustrate principles of the invention, FIG. 2 is a diagramatic view of another, more complex embodiment which employs a plurality of balancing arrangements, FIG. 3 is a perspective view of a mechanical light chopper employed in the embodiment of FIG. 2, FIG. 4 is a graphical view showing the outputs of two photodetectors during one complete cycle of the operation of the spectrometer FIG. 2, and FIG. 5 is a diagramatic view of another form of spectrometer embodying the invention.

Referring to the drawings, and in particular to FIG. 1, the spectrometer shown therein is intended for the remote detection of gases, for example sulphur dioxide in the atmosphere. Light containing the spectra to be measured, for example light which has reflected off the surface of the earth and has traversed the atmosphere, enters the spectrometer through an objective lens 11 which forms the light into a beam 12 which is directed through an optical-mechanical chopper 13 and a filter 14 to a beamsplitter 15. The function of the chopper 13 will be described below. The filter 14 is a conventional band pass filter designed to pass wavelengths of the general spectral range of interest while attenuating other wavelengths. Light from a reference lamp 16 is also directed to the chopper 13 by means of suitable optics (not shown). The reference lamp 16 produces light containing spectral components of appropriate wavelengths such that sufficient illumination passes through the filter 14 for the balancing purposes hereinafter explained.

The chopper 13 is a conventional optical-mechanical chopper which is designed alternately to permit the beam 12 to pass through to the filter 14 while blocking light from the reference lamp 16, and then to reflect light from the reference lamp 16 towards the filter 14 while blocking the beam 12. In this manner the incident light (i.e. light in the beam 12) and light from the reference lamp 16 alternately passes through the filter 14 to the beamsplitter 15. For maximum sensitivity, the chopper 13 should be designed to pass as much light in the beam 12 as possible, i.e. the beam 12 should be blocked by the chopper 13 for only enough time to enable the photodetectors described below to respond adequately to the light from the reference lamp 16. As an example, the duty cycle of the chopper 13 may be such that the chopper 13 passes the beam 12 during about ninety percent of each cycle of rotation of the chopper.

The beamsplitter 15 divides the light incident upon it approximately equally into two beams 17 and 18, which hereinafter are referred to as the measuring and reference beams respectively. The beamsplitter 15 is designed to be as spectrically flat as possible, i.e. the beamsplitter 15 should transmit all wavelengths of the general spectral region of interest as uniformly as possible. The measuring beam 17 passes through an interference filter 19 which has a band pass corresponding to the spectral region of interest of the gas being measured. For example, in the case of sulphur dioxide, the filter 19 may have a pass band of about 50A half peak width and a centre wavelength of about 3,100A. Light which has passed through the interference filter 19 is caused to shine on the sensitive face of a photodetector 20 which may be a photomultiplier or any other conventional electro-optical device appropriate for the wavelength of light being measured, with the required sensitivity for the particular application, and which is capable of converting the light incident upon it into an electrical current the amplitude of which is a function of the intensity of the light shining upon it. Similarly, the reference beam 18 passes through an interference filter 21 which is designed to pass wavelengths outside of the range of the wavelengths of the spectra being measured. In the case of sulphur dioxide, the filter 21 could have a pass band characteristic similar to that of the filter 19 but with a centre wavelength of about 3,200A. Light passing through the filter 18 shines upon the sensitive face of a photodetector 22 which is identical to the photodetector 20.

The electrical outputs of the photodetectors 20 and 22 are connected via leads 23 and 24 to a conventional electronic comparator circuit 25 which includes amplifiers for amplifying the outputs of the photodetectors 20, 22 and means for comparing the amplitudes of the outputs of the photodetectors 20, 22 e.g. obtaining their ratio or difference, in accordance with conventional practice. The output of the electronic circuit may be recorded or displayed on a meter 26 or both recorded and displayed if preferred. The electronic circuit 25 is provided with AGC circuits (automatic gain control) which are designed to equalize the outputs of the photodetectors 20, 22 when light from the reference lamp 16 is shining upon the photodetectors 20, 22. When photomultipliers are used, the AGC circuits may be used to adjust their respective gains to thereby achieve a balance in their respective outputs. The photomultiplier gains are held in such balanced condition during the period when the photomultipliers are exposed to the beam 12 and then, when the photomultipliers again are exposed to the reference lamp, the gains are re-adjusted if necessary to compensate for any drift which has occurred in the interim. This operation is repeated during each successive cycle of operation of the chopper 13. By this arrangement, any differences in the optical and electronic channels respectively associated with the photodetectors 20 and 22 are automatically compensated prior to each successive measurement of the incident light in the beam 12. Electronics of the kind commonly used in spectrometers of this kind are described in more detail in U.S. Pat. No. 3,518,002 of A. R. Barringer et al.

In the embodiment of FIG. 2, like reference numerals are employed to identify components which are the same as those described above with reference to the embodiment of FIG. 1. However, in this case the chopper 13 has a blade 13a having three sets of segmental surfaces 13b, 13c and 13d as shown in FIG. 3. In addition, light from the reference lamp 16 travels to the chopper 13 via two beams 27 and 28. The beam 27 passes through a filter 29 and the beam 28 is reflected from a mirror 30 so that the beam 28 is not filtered prior to reaching the chopper 13. The beam 27 is reflected off surfaces 13b of the chopper 13 and then proceeds through the filter 14 to the beamsplitter 15. The beam 28 is reflected off surfaces 13c of the chopper 13 and similarly proceeds through the filter 14 to the beamsplitter 15. Finally, the surfaces 13d are so disposed relative to the beams 12, 27 and 28 that they effectively block all of the light in these beams. Thus rotation of the three sets of surfaces 13b, 13c and 13d sequentially presents to the photodetectors 20, 22 (a) light in the beam 12 which contains the spectra to be measured, (b) light from the reference lamp 16 which has passed through the filter 29, (c) light from the reference lamp 16 which has reflected off the mirror 30, and (d) and dark condition when the surfaces 13d block all three beams 12, 27 and 28.

The blade 13a is constructed so that the beam 12 is transmitted through the blade 13a for a maximum amount of the period of each cycle of rotation of the blade 13a as discussed above with reference to the embodiment of FIG. 1.

The filter 29 is a conventional cell having quartz windows and which is filled with a sample of the gas to be measured, so that light passing through the filter 29 will suffer absorption at certain wavelengths corresponding to the absorption spectrum of the gas.

The outputs of the photodetectors 20, 22 are shown in FIG. 4. $Ag$ and $Ar$ represent the voltage outputs of the photodetectors 20 and 22 (as shown in FIG. 2) respectively during the period when the photodetectors 20, 22 are exposed to light in the beam 12. Voltages $Bg$ and $Br$ represent the outputs of the photodetectors 20, 22 when the photodetectors 20, 22 are exposed to light from the reference lamp 16 which has passed through the filter 29. Voltages $Cg$ and $Cr$ represent the outputs of the photodetectors 20, 22 when they are exposed to light from the lamp 16 via the mirror 30. Voltages $Dg$ and $Dr$ represent the outputs of the photodetectors 20, 22 when all incoming light has been shut off. The outputs of the photodetectors 20, 22 are fed to an electronic circuit 31 which is similar in function to the circuit 25 described above with reference to the embodiment of FIG. 1 except that an additional control loop is added for the following purpose. First, an AGC loop in the circuit 31 is employed to keep the voltage $Cr$ at the same level as that of the voltage $Cg$ by controlling the gain of the photodetector 20. The additional control loop equalizes the dark current levels of each photodetector by adding or subtracting a D.C. voltage to the output of the photodetector 20. Thus the AGC loop and the D.C. control loop referred to above respectively ensure that the response of the measuring and reference photoelectric channels of the spectrometer are identical during each measurement of the light in the beam 12, and that the zero (i.e. darkness reading) of the spectrometer does not drift. The voltages $Ag$ and $Ar$ may be analyzed or compared in accordance with conventional practice to determine the concentration of the gas or liquid being measured. In addition, the voltages $Bg$ and $Br$ may be monitored in order to provide a continuous check on the sensitivity of the spectrometer, or else with appropriate electronics, these voltages may be employed in a control circuit designed to maintain the sensitivity of the spectrometer at a predetermined constant level.

FIG. 5 illustrates an additional embodiment of the invention which does not require a mechanical light chopper. Referring to FIG. 5, light enters the spectrometer via an objective lens 32 and then passes through an interference filter 33 which selects the band of general interest, and then passes to a beamsplitter 34. Some of the light passes through the beamsplitter 34 and through a filter 35 to a photomultiplier 36. Another portion of light passes through a reference filter 37 and then on to a photomultiplier 38. The filters 35 and 37 correspond to the filters 19 and 21 described above and they define the beams referred to above as the "measuring" and "reference" beams respectively.

Both photomultipliers 36 and 38 are illuminated by a light source 39 which is modulated at a relatively high frequency typically in the order of 10 kilohertz. Light from the source 39 is divided by the beamsplitter 34 into two beams which respectively are directed to photomultipliers 36 and 38 along the same paths as the light entering the spectrometer. The modulation frequency of the lamp 39 is chosen to be well above that of fluctuation components expected to be observed in the incoming light. The intensity of the light produced by the lamp 39 is kept as low as possible compatible with maintaining balance between the two photomultipliers 36 and 38 to the required degree of accuracy. The reason for this is to minimize the introduction of additional photon noise into the system. The integration time of measurement of the reference signal can be lengthened to tens of seconds to compensate for the use of such low light levels.

The frequency components that correspond to the modulated frequency of the lamp 39 are extracted from each of the signals from the photomultipliers 36 and 38 by synchronous detection to achieve maximum signal to noise compatible with minimum light input from the lamp 39. The two signals detected in each photomultiplier are used to operate automatic gain controls or otherwise provide control signals which can be employed to balance the two photomultipliers. The lower frequency signals below the modulation frequency are processed according to conventional practice to obtain the gas concentration times path length intercepted by the incoming radiation. Although the spectrometer FIG. 5 is entirely feasible for use in the ultraviolet and visible portion of the spectrum, it is somewhat more difficult to use in the infra-red due to the relatively poor frequency response of infra-red detectors available at the present time as compared with photomultipliers.

It will be understood that any appropriate conventional electronic circuitry may be employed for achieving the objects of the invention. For example, instead of utilizing AGC feedback loops, the electronic circuitry may employ conventional digital processing of the signals from the photodetectors. Thus the output of each photodetector may be digitized and the digital voltages measured during each portion of the chopping cycle. Compensation for unbalance of the detectors is then applied, using conventional digital computing techniques.

Although the embodiments described above have utilized interference filters 19, 21 and in the case of the embodiment of FIG. 5, interference filters 35, 37 it will be understood that instead of using interference filters, two identical quartz cells could be employed, one being filled with a quantity of the gas to be measured, and the other cell being filled with a clean stable gas which exhibits little or no absorption in the absorption spectrum range of the gas being measured. For example, in the case of sulphur dioxide, the cell used in the reference beam may be filled with nitrogen which exhibits neglible absorption in the ultraviolet at about 3,000A. The nitrogen gas should be at about atmospheric pressure, and the other cell, i.e. the cell containing a quantity of the gas to be measured is preferably back filled with nitrogen or other stable gas so that the combined pressures of the two gases is approximately equal to atmospheric pressure.

It will be understood that in some cases the filter or cell, as the case may be in the measuring beam may be eliminated. However, it is advantageous to employ such a device in order to achieve close optical balance between the measuring and reference beams, where high sensitivity is required.

The light output of the reference lamp 16 should be kept reasonably constant, consistent with the required calibration accuracy of the spectrometer.

Although the embodiments of the invention described above have been intended for use in remote sensing gases present in the atmosphere, it will be understood that the invention is also applicable to the measurement of spectra in other absorptive or emissive sources. Another application of the invention is measuring gases present in hostile environments such as a smoke stack where temperature fluctuations and temperature gradients are often severe. In the case of gases present in a smoke stack, the invention can be employed to measure absorption in a beam of light passed through the stack. In such conditions, variations in particulate loading of the flue gases can cause strong fluctuations in the intensity of the light entering the spectrometer. At the same time, optical instruments mounted on the outside of a smoke stack are subject to severe thermal gradients which can cause major difficulties in any optical instrument unless special precautions are taken to guard against these problems. The present invention compensates for both fluctuation of light entering the spectrometer associated with variations and particulate loading as well as for temperature gradients. In addition, the inevitable accumulation of dust on the various optical components exposed to the flue gases is also compensated for in the present invention.

Although the embodiments described above are particularly intended for measuring the concentration of gases in the atmosphere, it will be understood that the invention is applicable to other common spectroscopic measurements, such as measurement of the concentration of liquids. For example, the concentration of phenols in a water supply can be measured using the ultraviolet absorption bands of phenols in water. A spectrometer constructed in accordance with the present invention would be relatively insensitive to fluctuations in water turbidity, which would be a serious problem for many conventional spectrometers.

An additional application of the invention is the measurement of fluoroescence of materials in sunlight. Two narrow band interference filters may be employed having a band width of 0.5A. One is centred on a deep Fraunhofer line in the solar spectrum and the other is centred a few Angstroms displaced from the said Fraunhofer line. The spectrometer is referenced against the sky using a light pipe of fibre optics to introduce light from the sky into the reference channel. In other words, light from the sky introduced into the spectrometer in this manner is used instead of light from an internal reference source such as the source 16. If there is any fluoroescence present in the light entering the spectrometer this will change the apparent depth of the solar Fraunhofer line and the ratio of the energy at the centre of the Fraunhofer line to the energy at the edge of the Fraunhofer line will change in comparison to the apparent energy of the reference derived directly from the sky.

The use of reference radiation from the sky is also beneficial when employing the invention in the remote sensing of gases using the reflected solar spectrum. Thus when the embodiment shown in FIG. 2 is utilized, fibre optics pointed to the sky can be substituted for the lamp 16. For example, when operating at 3,000 A for the measurement of sulphur dioxide, the sensitivity will change through the day due to the change in spectral slope of the solar spectrum in the vicinity of 3,100A. The embodiment shown in FIG. 2 provides a continuous calibration output as well as measurement of the gas concentration and with the use of a solar reference channel complete compensation may be made for changes in sensitivity associated with diurnal solar variations.

What is claimed is:

1. Spectroscopic apparatus for analyzing spectra of predetermined wavelengths, comprising:
   a. means for receiving radiation containing the spectra to be measured from a first source and for forming the radiation into a first beam,
   b. first and second photoelectric channels respectively comprising first and second photodetectors for converting radiation incident upon said photodetectors into electric currents and electronic circuit means connected to said first and second photodetectors for producing first and second signals which respectively are proportional in amplitude to the intensity of the radiation shining on said first and second photodetectors, said first photodetector being positioned to receive a first portion of radiation in said beam, said first portion constituting a measuring beam, and said second photodetector being positioned to receive a second portion of radiation in said beam, said second portion constituting a reference beam, said measuring beam containing the spectra to be measured and said reference beam containing spectral components of wavelengths such that comparison of the intensity of the measuring and reference beams provides a measure of the intensity of said spectra,
   c. means optically coupled to a reference source of radiation for producing a second beam of radiation,
   d. means operable cyclically for sequentially exposing said first and second photodetectors simultaneously to radiation in said first beam, and exposing said first and second photodetectors simultaneously to radiation in said second beam, and
   e. means for comparing the levels of said first and second signals when said first and second photodetectors are exposed to radiation from said first source including means responsive to the respective levels of said first and second signals when said first and second photodetectors are exposed to radiation in said second beam for compensating for the effect of any unbalance between said first and second photoelectric channels.

2. The invention as claimed in claim 1 wherein there is provided first filter means positioned in the path of said reference beam for permitting radiation of selected wavelengths to reach the second photodetector.

3. The invention as claimed in claim 1 wherein a second filter means is positioned in the path of said measuring beam for permitting radiation primarily of wavelengths corresponding to the wavelengths of said spectra preferentially to reach said first photodetector.

4. The invention as claimed in claim 3 wherein said cyclically operated means has a frequency that is higher than the frequency of fluctuations in the intensity of the light from the first source.

5. The invention as claimed in claim 4 wherein said frequency is about 1,000 Hz.

6. The invention as claimed in claim 1 wherein there is provided third filter means positioned between said reference source and said cyclically operated means comprising a cell containing a predetermined amount of a gas for producing a reference signal of predetermined intensity, wherein said cyclically operated means includes means for alternately directing light from said reference source which has passed through said third filter means and light from said reference source which has not passed through said third filter means to said first and second photodetectors, to provide a signal that is proportional in amplitude to the sensitivity of the apparatus.

7. The invention as claimed in claim 1 wherein said cyclically operated means includes means for preventing radiation from said first source and radiation from said reference source from reaching said first and second photodetectors during an interval of predetermined duration, and wherein means is provided for balancing said first and second photoelectric channels during said intervals.

8. The invention as claimed in claim 2 wherein there is provided third filter means positioned between said reference source and said cyclically operated means comprising a cell containing a predetermined amount of a gas for producing a reference spectral signal of predetermined intensity, wherein said cyclically operated means includes means for alternately directing light from said reference source which has passed through said third filter means and light from said reference source which has not passed through said third filter means to said first and second photodetectors, to provide a signal that is proportional in amplitude to the sensitivity of the apparatus.

9. The invention as claimed in claim 2 wherein said cyclically operated means includes means for preventing radiation from said first source and radiation from said reference source from reaching said first and second photodetectors during an interval of predetermined duration, and wherein means is provided for balancing said first and second photoelectric channels during said intervals.

10. The invention as claimed in claim 6 wherein said cyclically operated means incudes means for preventing radiation from said first source and radiation from said reference source from reaching said first and second photodetectors during an interval of predetermined duration, and wherein means is provided for balancing said first and second photoelectric channels during said intervals.

11. The invention as claimed in claim 8 wherein said cyclically operated means includes means for preventing radiation from said first source and radiation from said reference source from reaching first and second photodetectors during an interval of predetermined duration, and wherein means is provided for balancing said first and second photoelectric channels during said intervals.

12. The invention as claimed in claim 2 wherein a second filter means is positioned in the path of said measuring beam for permitting light primarily of wavelengths corresponding to the wavelengths of said spectra preferentially to reach said first photodetector.

13. The invention as claimed in claim 12 wherein there is further provided third filter means positioned between said reference source and said (directing) cyclically operated means comprising a cell containing a predetermined amount of a gas for producing a reference (spectral) signal of predetermined intensity, wherein said cyclically operated means includes means for alternately directing light from said reference source which has passed through said third filter means and light from said reference source which has not passed through said third filter means to said first and second photodetectors, to provide a signal which is proportional in amplitude to the sensitivity of the apparatus.

14. The invention as claimed in claim 12 wherein said cyclically operated means includes means for preventing radiation from said first source and radiation from said reference source from reaching said first and second photodetectors during an interval of predetermined duration, and wherein means is provided for balancing said first and second photoelectric channels during said intervals.

15. The invention as claimed in claim 13 wherein said cyclically operated means includes means for preventing radiation from said first source and radiation from said reference source from reaching said first and second photodetectors during an interval of predetermined duration, and wherein means is provided for balancing said first and second photoelectric channels during said intervals.

* * * * *